Jan. 8, 1963  R. M. ALLEN ET AL  3,071,816
CALCIUM CHLORIDE MANUFACTURE
Filed Jan. 19, 1960
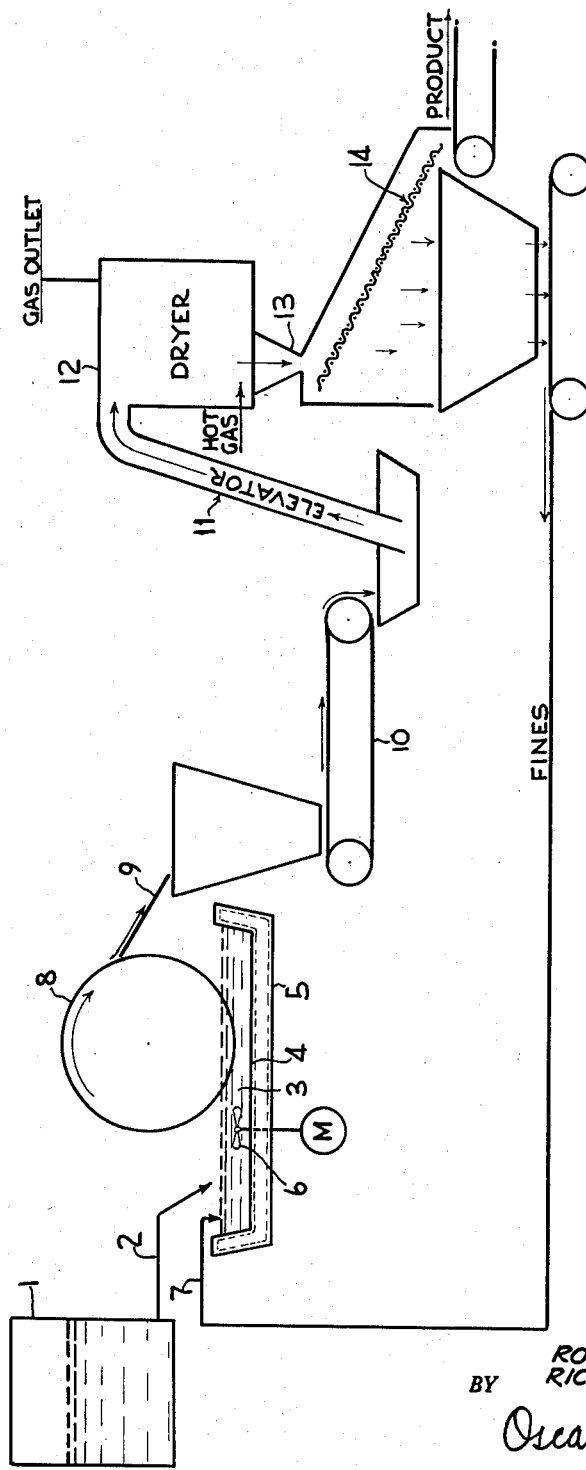
INVENTORS
ROBERT M. ALLEN &
BY  RICHARD J. WALTON
Oscar L. Spencer
ATTORNEY

United States Patent Office

3,071,816
Patented Jan. 8, 1963

3,071,816
CALCIUM CHLORIDE MANUFACTURE
Robert M. Allen and Richard J. Walton, Barberton, Ohio, assignors, by mesne assignments, to Pittsburgh Plate Glass Company
Filed Jan. 19, 1960, Ser. No. 3,326
3 Claims. (Cl. 18—47.5)

This invention concerns the manufacture of flake calcium chloride. More particularly, it involves improvements in the manufacture of flake calcium chloride from hot concentrated calcium chloride solutions.

In the production of concentrated solid calcium chloride products, dilute aqueous solutions are first concentrated by heating to obtain hot solutions having calcium chloride contents approximating the composition of calcium chloride dihydrate, e.g., between about 70 and 76 weight percent calcium chloride. Flake calcium chloride is obtained from these hot solutions (or comparable hot solutions regardless of source) by their deposition on the cooled surface of a revolving flaker wheel as a thin solidified layer which is removed by action of a scraper. As scraped free of the wheel, the calcium chloride is in the form of flakes. By contact with hot air or other heated gases such as the products of combustion of fuel, these flakes are dried. Depending upon how it is conducted, drying may remove only minor amounts of water, or may be extensive enough to dehydrate appreciably and increase considerably the calcium chloride content of the flaked product. Thereafter, and usually while at ambient temperature, the flaked products are screened or otherwise sized in compliance with commercial requisites.

According to this invention, flake calcium chloride is manufactured with considerably improved efficiency. In particular embodiments hereof, this increased efficiency and other benefits as will hereinafter become more apparent are attained utilizing those calcium chloride particles rejected during sizing and often regarded as waste. Hence, materials which heretofore often constituted a burden are fruitfully employed.

Now it has been discovered that the performance of a flaker wheel (and consequently, the manufacture of flake calcium chloride) is notably improved by maintaining solid particles of calcium chloride in the liquid composition from which calcium chloride is deposited upon the wheel surface. Advantages here achieved are manifested by one or more variants in the performance of the flaker wheel and/or in the product quality. One especially pronounced effect is the increased improved flaking capacity of a flaker wheel.

Calcium chloride is provided in the form of flakes by rotating about its horizontal axis a flaker wheel so positioned that its lower portion dips beneath the liquid level of a hot calcium chloride solution. This solution is contained in a flaker wheel basin, e.g., a container disposed around the lower portion of the flaker wheel. As it rotates, the wheel surface (which is relatively cool) passes through the liquid calcium chloride. Calcium chloride deposits upon the surface and a thin layer of solidified calcium chloride forms. This layer is then removed, as by scraping, from the surface to form the flakes.

In accordance with this invention solid particles of calcium chloride are included in the liquid contents of the flaker wheel basin. Thus, the liquid body from which calcium chloride deposits upon the flaking surface is a hot liquid slurry of concentrated calcium chloride. On a weight basis, the solid phase of the slurry amounts to 5 to 20 percent, ideally 8 to 12 percent, of the slurry.

The hot liquid calcium chloride slurry is of variable composition. Appropriate slurries are those having as their liquid phase aqueous calcium chloride solutions, the composition of which approximates calcium chloride dihydrate; e.g., calcium chloride concentrations of from about 70 to 76 weight percent. In general, the solid phase is provided by calcium chloride particles having a calcium chloride content which is at least as high as that of the solution. Quite frequently, the solid phase is established and maintained by adding to the flaker wheel basin particles of calcium chloride having a calcium chloride content higher than that of the solution. Thus, when the flaker wheel basin is charged with a hot aqueous calcium chloride solution containing 72 weight percent calcium chloride, calcium chloride particles containing about 74 to 96 weight percent calcium chloride may be dispersed in the solution to form an exemplary slurry.

According to a preferred embodiment hereof, the fine particles or powder rejected during sizing of the flake products are added to hot aqueous calcium chloride solutions to provide contemplated slurries. Such particles typically are smaller than 20 mesh, e.g., those fractions which pass through a 20 mesh screen. A preponderant weight proportion of these particles are between 20 and 200. Since, as a rule, these fines are otherwise of little or no value, this embodiment attains advantages through the utilization of wastes.

Notwithstanding the advantage of employing such fines for providing the liquid slurry, use of even larger calcium chloride is not precluded. Calcium chloride flake products sized to meet commercial requirements (between 20 mesh and ⅜ of an inch in size) or even larger calcium chloride particles function. Economics usually make their use, however, unattractive.

This invention may be explained and more fully understood by reference to the drawing which is a schematic representation of the process.

Hot concentrated aqueous solutions of calcium chloride containing between about 70 and 76 percent by weight calcium chloride (balance water) for preparing flakes are stored in holding tank 1, being therein maintained at about 340° F. to 360° F., notably about 352° F., if necessary by jacketing with steam or otherwise heating. Careful temperature control is advisable to prevent either solidification due to cooling or further dehydration of the calcium chloride solution.

From holding tank 1, hot liquid calcium chloride composition is fed through conduit 2 to liquid body 3 in steam jacketed flaker wheel basin 4. Liquid body 3 is maintained at the requisite temperature by applying steam, usually at 150 to 200 pounds per square inch pressure, to jacket 5. The solid phase in liquid body 3 is provided by adding calcium chloride fines from the screening operation (hereinafter described) to the slurry by conduit 7. Motor driven stirrer 6 agitates the slurry comprising liquid body 3, thereby maintaining good dispersion or distribution of the solid phase.

Liquid body 3 advisedly at a carefully regulated temperature is on the order of about 340° F. to 360° F., notably about 348° F. to 354° F. Steam jacket 5 serves this purpose.

Conversion of material from liquid body 3 to flakes is accomplished by use of flaker wheel 8. In operation, internally water cooled flaker wheel 8 rotates clockwise about a horizontal axis (as indicated by the arrow). The wheel's surface is thus at a temperature below the melting point of the liquid in body 3. In the path it traverses as the wheel rotates, the wheel surface passes into liquid body 3 and calcium chloride attaches thereto as a thin solid layer, usually between 0.01 and 0.15 inch in thickness.

Scraper knife or blade 9 dislodges this solidified layer from the flaker wheel in the form of flakes having a composition corresponding to that of liquid slurry comprising body 3. These dislodged flakes are then transported to dryer 12 by conveyer 10 and elevator 11. By the time they are presented to dryer 12, the flakes have cooled somewhat to below 350° F., usually between 200° F. and 300° F. The flakes are fed to an upper portion of dryer 12 and pass downwardly and countercurrent to heated gases introduced into the lower portion of dryer 12. Emerging from dryer 12, the flakes are fed to screen 14 via chute 13.

Using any of many appropriate screening apparatus 14, the flakes are sized. The undersize fraction or fines which in appearance are powdery are separated and suitably conveyed for addition to liquid body 3 via conduit 7.

The precise manner of operating dryer 12 depends upon the desired water content of the flakes. Flakes may be treated in dryer 12 simply to remove minor traces of moisture, thereby leading to a flake product containing a calcium chloride content substantially the same, or somewhat higher, than the calcium chloride concentration of liquid body 3. By driving more extensively, e.g., using hotter gases, the calcium chloride content of the flakes will range up to 94 or 96 percent by weight.

Appropriate screens are selected consistent with meeting commercial requirements of flake size. Typically, a commercial calcium chloride flake product is of particles larger than 20 mesh and smaller than ⅜ inch in size.

The following example illustrates more specifically the manner in which the present invention may be performed.

*Example*

Flake calcium chloride product is produced according to the process schematically described in the drawing. Thus, a hot aqueous solution of calcium chloride containing 74 weight percent calcium chloride (balance water) is fed to a jacketed flaker wheel basin 6 feet long, 5 feet wide and 8 inches deep to provide a liquid body of calcium chloride in the basin. The liquid body is maintained at about 352° F. by introduction into the jacket of steam at 200 pounds per square inch gauge.

About 2400 pounds per hour of calcium chloride powder containing 78 percent by weight calcium chloride (the balance water) of minus 20 mesh particle size is added to the basin. Together with the rate at which calcium chloride solution is supplied, a substantially constant liquid level is maintained. A motor driven stirrer insures essentially uniform distribution of solid phase throughout the slurry in the basin.

Flaker wheel 8 is 6 feet in diameter and 4 feet long and internally cooled with water at from 60° F. to 80° F. Its lowermost surface is about 4 inches above the bottom of the flaker basin and immerses in the liquid body. With the flaker wheel rotating at 19 revolutions per minute, a layer about 0.05 inch in thickness (although it varied at times in the range of 0.03 to 0.1 inch) of solidified calcium chloride forms on the wheel surface.

This layer is removed continuously by use of a typical scraper and the scrapings transported to a tray dryer. As they are fed to the upper section of the dryer, the flakes are at about 250° F. In the tray dryer, the flakes move countercurrent to an upwardly flowing stream of air introduced to a lower portion of the dryer at 60° F. When removed from the upper section, the air has warmed to from 300° F. to 400° F. Heat is supplied by introducing combustion gases of fuel at a temperature of about 600° F. into the dryer.

From the tray dryer, the dried products having a calcium chloride content of 78 weight percent (a small amount of water having been removed by the drying) are then screened to segregate those particles no smaller than 20 mesh and no larger than ⅜ inch in size. The undersize materials segregated during this screening, e.g., particles of calcium chloride smaller than 20 mesh, are recycled to the flaker wheel basin as already described. This recycle amounts to 2400 pounds per hour.

Flake calcium chloride product within the desired size obtained after screening is thus produced at the rate of 14 tons per hour.

Without so including and maintaining solid calcium chloride in the liquid contents of the flaker wheel basin, comparable flaking operations attain a product rate of about 10 tons per hour. This indicates a 40 percent increase in productivity.

It should be understood that flaking may be performed consistent with this invention by recourse to conditions other than those already specifically mentioned. For example, the rate of the flaker wheel rotation varies, among other things, depending upon the solids content of the liquid body in the flaker wheel basin. When fines are added to the flaker wheel basin using the equipment described in the foregoing example at the rate of about 25 pounds per minute (1500 pounds per hour), the flaker wheel is best rotated at 16 revolutions per minute. It is not unusual for rotation rates of the flaker wheel described in the example to vary from 10 to 30 revolutions per minute.

In lieu of operating the tray dryer as described in the foregoing example, comparable benefits of increased flaking capacity obtain when the drying is more extensive and provides a calcium chloride flake product containing 94 weight percent calcium chloride.

While the present invention has been described with respect to specific details of certain embodiments, it is to be understood it is not intended that the invention be construed as limited to such details except insofar as they appear in the appended claims.

We claim:

1. In the method of preparing sized flake calcium chloride product by depositing from a hot liquid body of calcium chloride a layer of solidified calcium chloride upon a cool surface, removing the layer from the surface and sizing so removed solids to obtain calcium chloride fines smaller than 20 mesh, the improvement which comprises depositing the layer from a hot liquid body comprising a slurry of solid calcium chloride particles and aqueous liquid calcium chloride solution which solution has a composition approximating that of calcium chloride dihydrate and adding said fines from the sizing to the hot liquid body whereby to provide for the solid calcium chloride particle content of the slurry.

2. The method of claim 1 wherein sufficient fines are added to the hot liquid body to provide from 5 to 20 percent solid calcium chloride by weight of the liquid body.

3. In the method of preparing sized flake calcium chloride product by deposition from a hot liquid body of calcium chloride of a layer of solidified calcium chloride upon a cool surface, removing the layer from the surface and sizing so removed solids to obtain fines smaller than 20 mesh, the improvement which comprises depositing the layer from a hot liquid body comprising a slurry of solid calcium chloride particles and aqueous liquid calcium chloride solution which solution has a calcium chloride content approximating the composition of calcium chloride dihydrate and adding said fines from the sizing to the hot liquid body to provide said solid calcium chloride particles in a concentration of from 5 to 20 percent by weight of the liquid body, said fines having a calcium chloride content substantially the same as that of said liquid calcium chloride solution.

References Cited in the file of this patent

UNITED STATES PATENTS

| | | |
|---|---|---|
| 1,112,722 | Scharff | Oct. 6, 1914 |
| 1,203,740 | Holter | Jan. 6, 1914 |
| 1,527,121 | Cottringer et al. | Feb. 17, 1925 |
| 1,851,309 | Heath | Mar. 29, 1932 |
| 2,136,069 | Beekhuis | Nov. 8, 1938 |
| 2,402,192 | Williams et al. | June 18, 1946 |
| 2,483,254 | Almy | Sept. 27, 1949 |

OTHER REFERENCES

"Chemical Engineering Handbook" (Perry), published by McGraw-Hill (New York), 1950, pp. 1054–1056 relied on.